DIFFERENTIAL GEAR STEPPING AND MARKING DEVICE

Filed Sept. 21, 1955 4 Sheets-Sheet 1

INVENTOR.
PAUL R. HOFFMAN
RICHARD L. HOISINGTON
BY William R. Nolte
AGENT

Dec. 17, 1957 P. R. HOFFMAN ET AL 2,816,759

DIFFERENTIAL GEAR STEPPING AND MARKING DEVICE

Filed Sept. 21, 1955 4 Sheets-Sheet 2

INVENTOR.
PAUL R. HOFFMAN
RICHARD L. HOISINGTON

BY William R. Nolte

AGENT

*INVENTOR.*
PAUL R. HOFFMAN
RICHARD L. HOISINGTON
*BY*
William R. Nolte
AGENT

DIFFERENTIAL GEAR STEPPING AND MARKING DEVICE

Filed Sept. 21, 1955 4 Sheets-Sheet 4

INVENTOR.
PAUL R. HOFFMAN
BY RICHARD L. HOISINGTON
William R. Nolte
AGENT

United States Patent Office 2,816,759

Patented Dec. 17, 1957

2,816,759

DIFFERENTIAL GEAR STEPPING AND MARKING DEVICE

Paul R. Hoffman, Woodlyn, and Richard L. Hoisington, Collegeville, Pa., assignors to Burroughs Corporation, Detroit, Mich., a corporation of Michigan Application September 21, 1955, Serial No. 535,618

7 Claims. (Cl. 271—2.4)

This invention relates to printing or marking devices and particularly to mechanisms used in printing devices employing a continuous tape or like medium wherein the mechanisms convert continuous motion to intermittent motion to stop or otherwise vary the motion of the tape during the marking period.

Marking devices employing the continuous paper tape usually require that the tape be momentarily stopped during the period that the tape is punched, printed or marked as desired. If the tape was continuously advanced through the marking device without being stopped the tension on the tape might be such that it would cause the tearing of the tape during the interval of time that the marking device is in contact with the tape. Even if the tape does not tear, it may be pulled through the marking device during the marking interval causing the blurring or overlapping of the marks on the tape. For these reasons it is desirable to intermittently drive the tape and mark the tape during the intervals of time when the tape is substantially at rest. The speed with which the intelligence can be transferred onto the tape is in part determined by the operating speed of the mechanism providing the intermittent tape drive. Accordingly, there is a need for a mechanism that will provide intermittent tape drive without seriously limiting the speed of the marking device.

Various mechanisms, including ratchet-detent mechanisms, have been used in the prior art to advance the tape, but in general these mechanisms are incapable of operating at the desired speeds of our present day high speed tape marking devices. At high speeds ratchet devices are likely to cause irregular motions or free coasting periods. The force imparted to the ratchet wheel by the pawl may not be sufficient to bring the pawl into proper engagement with the ratchet wheel to advance it or it may be excessive and cause the wheel to coast beyond the next position. The result of this erratic drive may be that the tape is not advanced to the next position or it may skip a position. Therefore, means should be provided to convert high speed continuous motion to high speed intermittent feed providing positive stepping motion of the tape at high speeds.

The desired angular length of the rest period of the tape per cycle, hereinafter referred to as dwell time, is determined by the type of equipment used in conjunction with the tape feed mechanism and the type of punch used for any particular application. Since many devices require various tape driving speeds, a non-variable rest period or dwell time is selected which is based upon the longest time interval necessary, thereby reducing efficiency for all of the various driving speeds. Accordingly, a positive intermittent tape feed drive is desired wherein the rest period can be readily changed to provide highest tape driving speed efficiency and one which enables the dwell period to be readily adjusted to accommodate the punching of the tape. To accomplish the desired objects of this invention, it has been found that a wobble gear mechanism of the type described in the publication by E. Hortan entitled "Ingenious Mechanisms for Designers and Inventors," vol. III, p. 322–325, published by the Industrial Press may be adapted as a tape feed drive. In accordance with the present invention, a tape feed drive is obtained with the wobble gear mechanism adapted to provide a variably selectable rest period.

It is, therefore, a general object of the invention to provide an improved tape feed mechanism.

It is another important object to provide positive acting means to advance a tape at variable speeds.

It is still another important object to provide means to vary the dwell time of the intermittent motion.

It is a further important object of the invention to provide an improved differential gear stepping and marking device adapted for high speed marking whereby the tape is successively advanced and stopped for predetermined periods in synchronism with the marking operation.

It is still a further important object of the invention to provide such a mechanism which provides a high step-down ratio in a small space and an adjustable dwell time of any desired value from zero to almost one-half a cycle.

It is yet another important object of the invention to provide an improved mechanism for intermittently driving tape which is smooth in operation, with gradually applied accelerations and decelerations, which is positive in action and avoiding any free coasting periods, and which is capable of higher speeds than presently used driving equipment of this character.

In accordance with the teachings of the present invention, there is therefore provided a positively acting tape feed mechanism which will not allow the tape to skip a step or dwell on the same step beyond a predetermined time and which is capable of being adjusted to vary the tape dwell time in accordance with the desired time governed by the variable speed of the marking system. Moreover, simplified synchronism of the feed mechanism and the marking device may be obtained by driving them from a single shaft.

Other objects and features of advantage of the present invention will be found throughout the following more detailed description of the invention particularly when considered in connection with the accompanying drawings, in which.

Figure 4:
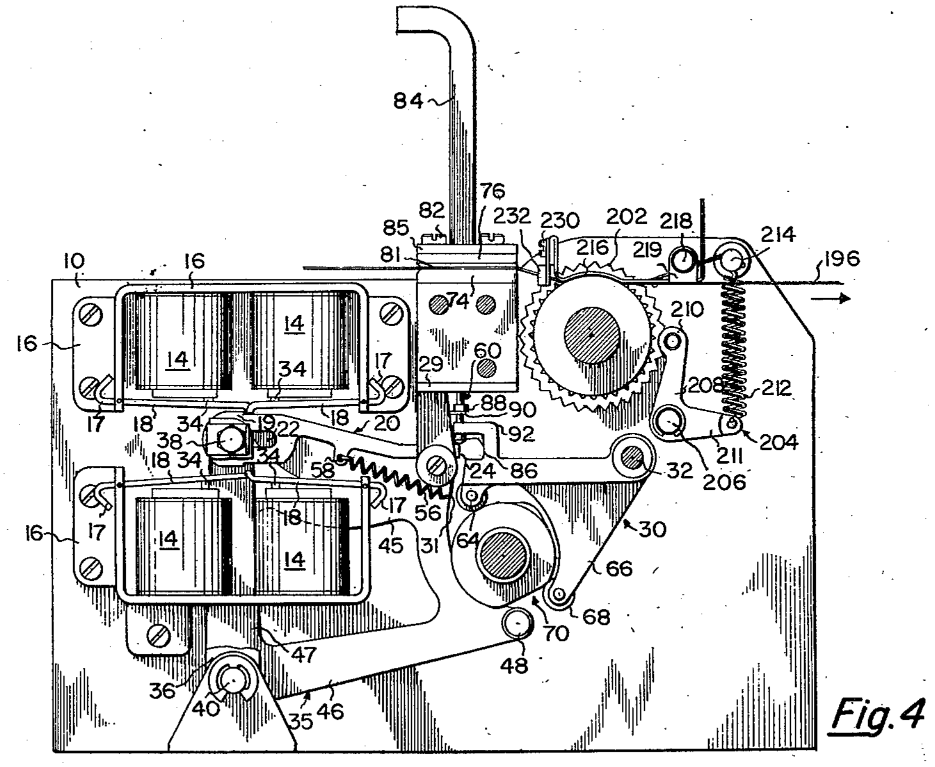
Fig. 4 is a vertical section wtih some parts in elevation showing the selecting means, punch operating mechanism, and tape feeding drum taken along the line 4—4 of Fig. 1.

In the embodiment of the invention herein described a differential gear stepping mechanism is combined in operation with an associated paper tape punch. The mechanism is driven in timed relation and in unison with the punch actuating means to obtain synchronism such that the tape rests while the punching is being performed and moves to a successive position during intermissions between punching operations.

The differential gear stepping mechanism embodies a main punch drive shaft which drives an eccentric upon which an inner gear, having externally extending teeth, is journalled. The inner gear meshes with and drives an outer gear journalled on the main drive shaft. The inner gear has a lesser number of teeth than the outer gear and the difference in diameters of the inner and outer gears is precisely the throw of the eccentric. Rotation of the eccentric causes the external teeth of the inner gear to successively engage with the internally extending teeth of the outer gear, thus forming a complete contact around the interior of the outer gear.

A member having a pin and slot connection with the inner gear, controls the rotation of the inner gear about its axis, notwithstanding its gyratory motion about the axis of the outer gear. The pin may be located on the inner gear and the slot engaging said pin may be shaped over a certain portion of its length that the inner gear is restrained from rotating about its axis and thereby drives the outer gear which, through a suitable positive drive connection, advances the paper tape of the punch. The remaining portion of the slot may be so shaped as to permit angular motion of the inner gear about its axis, during which interval no motion is imparted to the outer gear which dwells while the punching operation is being performed. The member containing the slot may be tilted or the slot may be so shaped that any desired period of dwell may be obtained.

Many features included in the disclosure of the present application are also disclosed and are claimed in the copending application of Paul Hoffman, Serial No. 535,559 filed on September 21, 1955, now Patent No. 2,775,300.

Referring now to Figs. 1, 2, 4 and 5 there is shown a marking device which in this instance is adapted to perform a punching operation on paper tape and incorporates the applicants' improved change speed stepping mechanism. The punching device is supported between a pair of parallel, vertical extending side plates 10 and 12 of the main frame. A plurality of pulse operated selector solenoids 14, eight in number in the present instance, for receiving code signals, are secured to brackets 16 which in turn are secured to side plate 10. Each solenoid 14 has a clapper finger 18 which is pivotally mounted upon its associated bracket 16 and has at its pivot end a portion 17 bent upon itself which can be adjusted to vary the open gap position of the solenoid. The free end of each solenoid clapper finger 18 cooperates with a shoulder portion 19 of an interposer 20. Springs 34 urge the clappers out of engagement with the solenoids when they are not energized. Each interposer 20 is an elongated member having an elongated eye portion 22 and a forward end 24 which is supported on an eccentric pin suspended by bracket 28 from the bottom punch plate 29, for its advancing and retractable movement. Details and a further use of the eccentric pin 26 will be later described.

Figure 3:
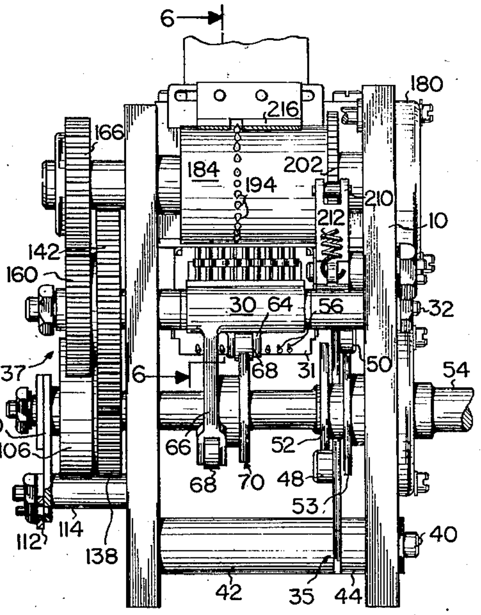
Fig. 3 is an end elevational view of the apparatus illustrated in Fig. 1.
Figure 8:
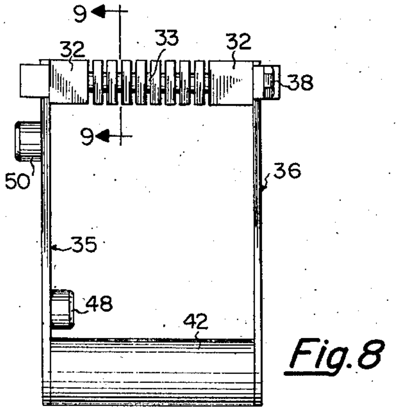
Fig. 8 is a rear elevational view of the interposer bail and frame which restores the interposers upon the completion of each printing cycle.
Figure 9:
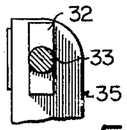
Fig. 9 is a sectional view through the interposer bail taken along the line 9—9 of Fig. 8.

The elongated eye portion 22 of each interposer 20 is mounted in a different slot of a slotted guide bail 32, see Fig. 8. Guide bail 32 forms the upper horizontal member of an inverted generally U-shaped bail frame including side arms 35 and 36. The guide bail is secured to the mechanism by a bolt 38. Vertically below the bail frame is a cross shaft 40 upon which the lower ends of the side arms of the bail frame are pivoted. Spacer sleeve members 42 and 44 are carried by the shaft 40 to properly space the side arms of the bail frame. One of the side arms of the bail frame, such as 35, is provided with a journal extension which may be in plate form or exhibit an open frame formation as shown in Fig. 4. The extension comprises the top and bottom members 45 and 46 and a relatively vertically extending member 47. At the forward end of the extension are two cam following rollers 48 and 50 which are vertically spaced apart and preferably project from opposite sides of the plane of the extension as is evident in Figs. 3 and 8. The two rollers cooperatively engage a bail operating cam mounted on the main drive shaft 54. It will be noted that the bail operating cam 51 has two cam contours 52 and 53 with which the rollers 48 and 50 engage, the cam contours being fixed to sleeve 55 which in turn is pin connected to shaft 54 as at 57. The cam contours 52 and 53 are disposed in such a manner that a positive actuating force is applied to the bail frame at all times, thus eliminating the need for extraneous biasing elements such as springs.

Figure 5:
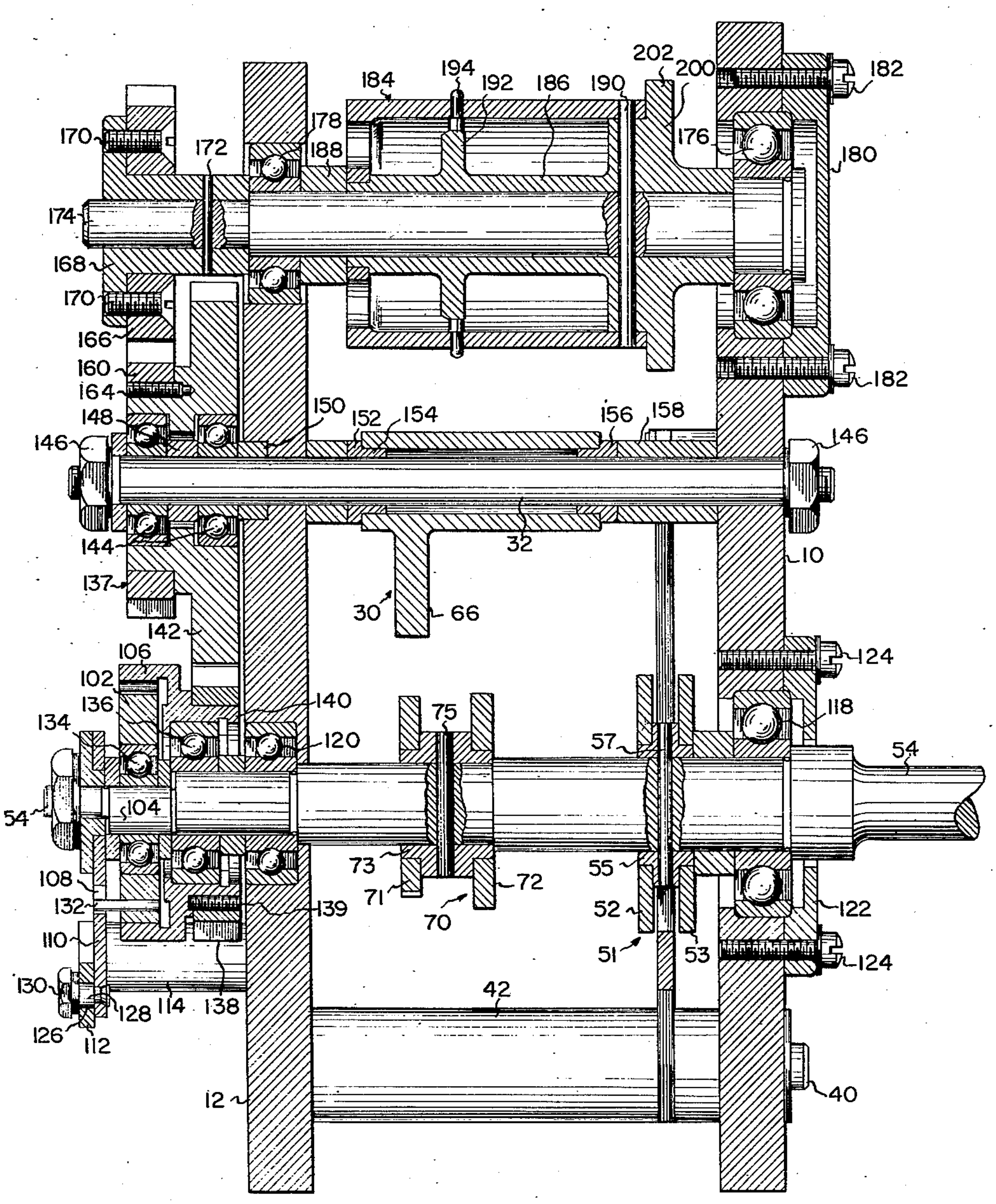
Fig. 5 is an enlarged detailed vertical sectional view of the wobble gear mechanism and associated driving elements for rotating the tape feeding drum, taken along the line 5—5 of Fig. 2.

When any one of the selector solenoids 14 is energized for a marking operation, its clapper finger 18 is attracted and disengages from the associated interposer 20. A spring 56 is associated with each interposer and is fastened at one of its ends to shoulder 58 of the interposer and at its other end to an inclined lip portion 31 of bracket 28. Each spring 56 tends to pull its interposer 20 forwardly into a marking position. In retracted position, each interposer 20 is adapted to cooperate, at its forward end, with the bottom end of an associated punch member 60, see Figs. 4 and 6. As will presently appear, the bottom end of the punch pin 60 which cooperates with the interposer 20 is such that the point of contact between the punch pin and the interposer is coincident with the vertical centerline of the punch pin. Each interposer 20 is in addition, slidably received on the top portion of an actuating plate or hammer 30 pivotally carried on shaft 62. As shown in Figs. 4 and 5, the hammer 30 has integral therewith arm portions 64 and 66 each carrying a follower roller 68. Follower rollers 68 cooperate with the perforator operating cam 70 carried on main drive shaft 54. Cam 70 likewise has two cam contours 71 and 72 which are fixed to a sleeve 73 which in turn is pin connected to shaft 54 by pin 75. As previously mentioned in the case of the bail operating cam 52, the perforator operating cam has likewise two cam contours so as to provide a positive punch actuating force for a purpose which will presently appear, see Fig. 5.

When the forward end of each interposer 20 is in its marking position (see dotted line position, Figure 6) it is projected over the hammer 30 and between the punch. When hammer 30 is caused to rise by rotation of the aforementioned cam 70, those punch members 60 whose interposers have been moved forwardly, are lifted vertically and are conformed to slide through guide plate 29. The guide plate 29 is the bottommost of three plates through which each punch member 60 travels. It has rather large clearance holes in it for rough guidance purposes for the pins. Travelling upwardly to the second guide plate 74, it is essential that the punch pins 60 be guided with the greatest degree of precision. The clearance between the holds in the second guidance plate and the punches is less than it is between the holes in the first guiding plate 29 and the top member or die plate 76. This is done to attain the most precise and ideal arrangement for the die member 76, thereby eliminating bowing or buckling thereof in use. Spacer blocks 78 and 80 are placed between plates 30 and 74 and are suitably secured therebetween. Die plate 76 is secured in proper alignment with guide plate 74 by corner bolts 82 but spaced therefrom by suitable spacer elements 81 to receive a tape of a predetermined thickness. These bolts in addition secure chute 84 and chute attaching plate 85 over the apertures of die plate 76 for removal of the chips or chads as the tape is perforated.

Figures 6, 7:
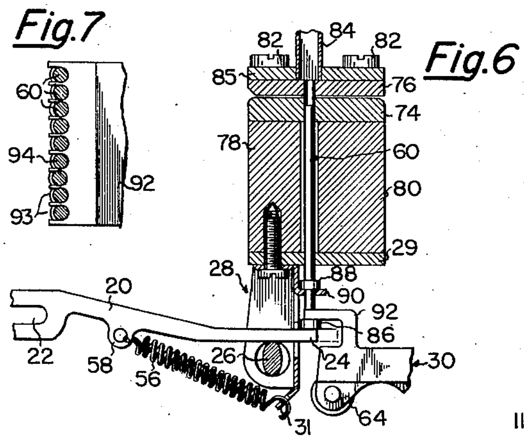
Fig. 6 is an enlarged sectional view of the punch and operating hammer, taken along the line 6—6 of Fig. 3.
Fig. 7 is a sectional view through the punch pins and illustrating the comb portion of the punch hammer which engages the pins taken along the line 7—7 of Fig. 6.

Considering the structure of punch pins 60 in greater detail it is observed that when the interposers 20 are in their retracted positions, or moved back by the bail 32, each punch pin 60 is permitted to fall down only a predetermined distance, see Fig. 6. Each pin 60 carries two enlarged cylindrical collars 86 and 88. The topmost collar 88 is engaged by the horizontal lip portion 90 of bracket 28. The vertical distance between collars 86 and 88 and the position of the lip portion is selected so that the top of each interposer 20 in its forward or marking position clears the bottom collar 86 of its associated punch pin 60. Rising vertically and then extending horizontally from the top portion of the hammer 30 is a tongue portion 92. The tongue 92 has a plurality of notches 93, one for each punch pin 60, and serves as a comb member, see Fig. 7. The spans of said comb member overlie the lower collars 86 of the pins. After a punching operation has occurred and on the return stroke of the hammer 30, the tongue 92 engages the lower cylindrical collar 86 of each punch pin 60 and pulls each pin back down through the tape. Tongue 92 also functions to maintain the upper working ends of the punches 60 normally below the upper surface of guide plate 74 and clear of the material to be perforated when the punches are not operated. Thus it is seen that tongue member 92 serves as a non-yielding punch stripping instrumentality.

When any interposer 20 is advanced to its forward or marking position and the hammer 30 is raised by rocking on its pivot, the interposer will rock about the pivot that is provided by bail 32. In this relationship with interposer 20 moved under its respective punch, each interposer 20 serves as part of the drive mechanism for lifting the punch pin 60. Conversely when any interposer 20 is in its retracted or non-punch position, its corresponding punch pin will not be driven. In this situation the maximum rise of the hammer 30 is such that it cannot close the gap between itself and the lower end of the punch pin 60 with which the interposer is associated. Consequently, the punch pin corresponding to this interposer cannot be driven to punch the tape.

Figure 1:
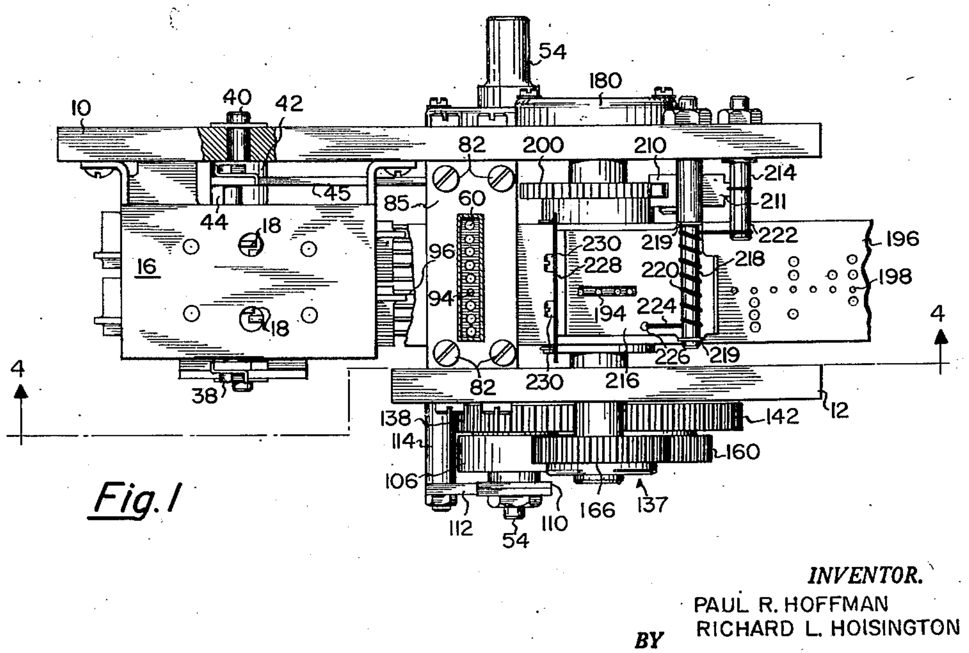
Fig. 1 is a top plan view of our invention.

As previously mentioned in addition to the eight code punch pins 60 there is a feed punch pin 94 and an associated interposer 96, see Fig. 1. There is no corresponding solenoid for this interposer 96, consequently interposer 96 is allowed to position itself in the space between the feed punch 94 and the hammer 30 during every revolution of the main drive shaft 54. As will later be described herein, the holes punched in the tape by punch pin 94 is engaged by a sprocket wheel for advancing the tape.

Figure 2:
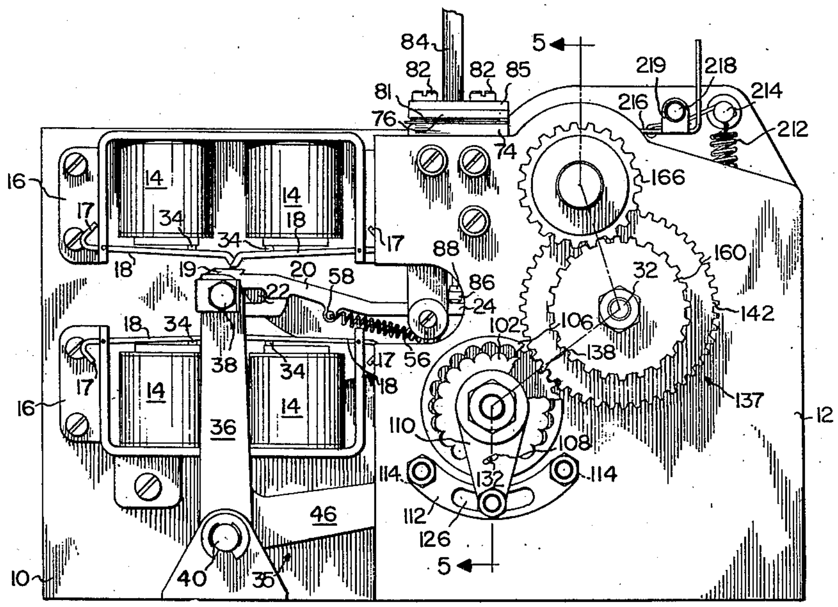
Fig. 2 is a side elevation view of the apparatus illustrated in Fig. 1 and showing one form of wobble gear mechanism.

The dwell or rest period of the tape is determined by the configuration of the dwell slot 108 located on the dwell plate 110 which will be more fully explained hereinafter in conjunction with the detailed description of the differential gear stepping mechanism. The dwell period may be changed for various applications by replacing dwell plate 110 with a similar plate having a dwell slot of a different geometrical configuration. The dwell plate 110, in the embodiment of the invention shown in Figs. 2 and 5 is pivotally journalled on the input shaft 54 at one extremity and is adjustably fixed at its opposite extremity to an arcuately shaped slotted member 112. Slotted member 112 is rigidly secured to frame plate 12 by means of threaded end posts 114—114, and received into said plate at one end and secured at their outer ends by nuts 116. It will be noted that main drive shaft 54 is mounted so that it can be freely rotated by means of ball bearing assemblies 118 and 120 mounted in the side plates 10 and 12 respectively. Ball bearing assembly 118 is secured in place in plate 10 by means of bearing retainer 122 and bolts 124. An arcuate slot 126, which is centered on the axis of shaft 54, is provided in member 112 through which extends a pin 128 secured at one end to dwell plate 110 and receiving a nut 130 at its other end. The slot and pin fastening means permit the dwell period of the tape advance means to be changed by moving the plate so that the slot in the dwell plate 110 is adjusted to a different position as will be presently described. The slot and pin fastening means 108—132 restrain the inner gear from obtaining any net rotation. The inner rotor 102 of the stepping mechanism has affixed thereto a dwell pin 132 which is guided by an inclined slot 108 in the dwell plate 110. An inner gyrating gear 102, having externally extending teeth, is journalled for rotation on the eccentric portion 104 of the main drive shaft 54 by ball bearing assembly 134 so that its center is revolved about the axis of the shaft 54. Outer gear 106, having internally extending teeth, is likewise journalled for rotation on the main drive shaft 54 by ball bearing assembly 136. The difference in diameters of the inner and outer gears is precisely equal to the throw of the eccentric 104. The inner gear 102 being rotated out of center with respect to the outer gear 106 within said outer gear operates to bring the external teeth of the inner gear in successive mesh with the internal teeth of said outer gear successively about its tooth periphery. In so doing the outer gear 106 is caused to rotate. The manner by which the driving action of the outer gear may be caused to operate in a step-by-step driving action will be discussed in detail hereinafter.

The driving motion imparted to the outer gear 106 is transmitted to tape advance drum 184 by means of the gear train 137. A ring gear 138 is fixed by threaded pin 139 on a sleeve-like extension 140 of outer gear 106 for joint rotation therewith and meshes with idler gear 142. Idler gear 142 is mounted on the aforementioned hammer shaft 32 by means of a pair of ball bearing assemblies 144. Shaft 32 is secured to the frame plates 10 and 12 by means of nuts 146, and suitable spacer elements 148 between the two bearing assemblies. Additional spacer elements 150, 152, 154, 156, and 158 are mounted on the shaft between the frame plates. Ring gear 160 is likewise fixed upon a sleeve like portion 162 of idler gear 142, being secured thereto by threaded pin 164. Meshing with ring gear 160 is ring gear 166 which is fixedly secured to sleeve element 168 by screws 170. A pin 172 locks sleeve 168 to driven shaft 174 which is mounted for rotation in the frame plates 10 and 12 by means of ball bearing assemblies 176 and 178, respectively. Bearing retainer 180 and cooperating bolts 182 secure bearing assembly 176 within the frame plate 10.

A tape advance drum 184 is mounted on a sleeve member 186, which also functions as a spacer, and both the drum and sleeve are pinned to driven shaft 174 by pin 190. A spacer 188 may be interposed between the sleeve and bearing assembly 178. Flange portion 192 integral with and spaced from one end of sleeve member 186 carries a plurality of tape advance pins 194 spaced equally about the periphery of the flange. These pins project through apertures in the drum 186 beyond its cylindrical outer surface and serve to engage a tape 196 in its feed hole apertures 198 formed by the punch pin 94 as is evident in Fig. 1. An enlarged detent flange 200 is provided at one end of the sleeve member 186 and tape advance drum 184 and has a plurality of teeth 202 cut into its periphery equal in number to the number of pins 194 in the drum.

Referring to Fig. 4, a bell crank 204 is shown mounted on pivot 206 to frame plate 12 for movement thereabout. The vertical arm 208 of the bell crank carries a roller 210 which engages in the notches between the teeth 202 of the detent flange 200 coupled to the tape advance drum.

The horizontal arm 211 of the bell crank is connected at its extremity to a spring 212 which is secured at its upper end to plate 10 by means of post 214. For every revolution of the main drive shaft 54, the tape advance drum through its pins 194 will move the tape 196, the distance between two adjacent pins on the drum. The bell crank actuated by spring 212 and thus being in contact with the detent flange 200 on the tape advance drum, prevents the drum from backing up.

Mounted above and extending over the top of the tape advance drum 188 is a retaining plate 216 which is curved to conform to the curvature of the drum. The plate 216 is pivotally mounted to a post 218 which projects laterally from frame plate 10. For this purpose a pair of upstanding ears 219—219 integral with said retaining plate engage the post for said pivotal movement. A coil spring 220 encircles post 218, see Fig. 1, and has one end 222 thereof fixed to post 214 and its other end 224 fixed to plate 216 as at hole 226. The action of the spring is such as to urge plate 216 at all times into contact with paper tape to help insure that the tape meshes with the pins. The end of the plate remote from the pivot connection carries a guide member 228 which is secured to said plate by bolts 230. Member 228 has two downwardly depending fingers 232 at each end thereof which restrain the tape against lateral movement with respect to the tape advance drum 188.

Figure 10:
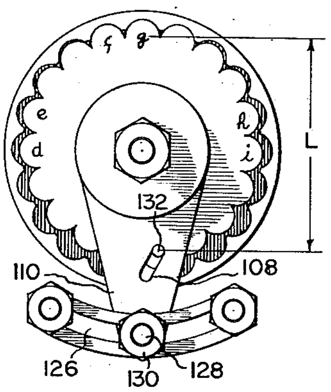
Fig. 10 is an enlarged elevational view of the wobble gear mechanism shown in Fig. 2.

The detailed operation of the differential gear stepping mechanism 103 will now be described with reference to Figs. 5, 10 and 11. The inner rotor 102 and the outer rotor 106 have semi-circular teeth 126 and 128 respectively in this particular embodiment, however, the gear teeth may be of any suitable curvature. The number of teeth in the inner rotor 102 is one less than the number of teeth in the outer rotor 106. A difference of more than one tooth will provide satisfactory operation but the step down ratio will change. In the embodiment shown in Figs. 5, 10 and 11 the outer rotor 106 has twenty teeth and the inner rotor has nineteen teeth. The output ratio of the stepping mechanism 103 is the difference in the number of teeth between the outer rotor 106 and the inner rotor 102 compared to the number of teeth in the outer rotor 106. In this instance, we have twenty teeth in the outer rotor and nineteen teeth in the inner rotor. The difference is one, and since there are twenty in the outer rotor, the ratio is twenty to one. A further reduction is taken through the gear train 137 consisting of gears 138, 142, 160 and 166 such that the end result is a thirty to one reduction. There are thirty pins 194 projecting from tape advance drum 186 and thus for every complete revolution of the input shaft 54 a thirtieth of a revolution is obtained from the output shaft 174. This corresponds to the advancement of the tape by one notch.

Figure 11:
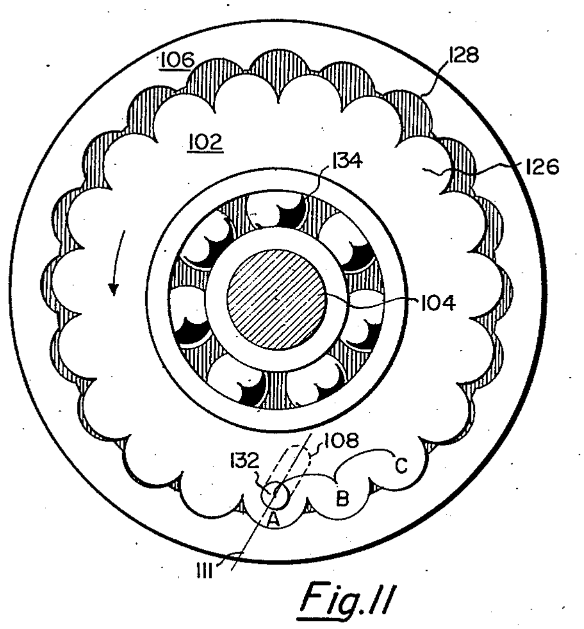
Fig. 11 is an enlarged plan view of a part of the mechanism of Fig. 10 but with the dwell plate removed for purpose of clarity.
Figure 12:
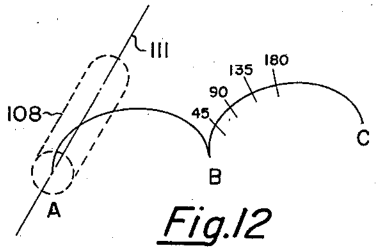
Fig. 12 is an enlarged view of the curved path generated by the dwell pin of Fig. 11.
Figure 13:
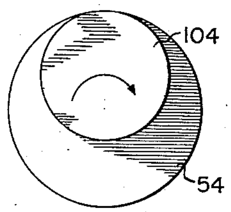
Fig. 13 is an enlarged view of the eccentric portion of the main drive shaft.

To better analyze the respective motion of the gears of the change speed stepping mechanism, reference is had to Figs. 11, 12 and 13. The inner rotor 102 is shown coupled to the eccentric portion 104 of the input shaft 54 with ball bearing race 134 intermediate therebetween. It will be originally assumed that the inner gear 102 is unrestrained throughout a complete revolution of the main drive shaft 54 and the outer gear 106 is fixed against rotation so as to prevent any possibility of its being driven thereby. It is further assumed that the dwell pin 132 is fixed at a pitch point on the inner gear 102. Pitch point, as herein referred to, is a point on a tooth of the inner gear, said point lying on the pitch circle of the inner gear and being equidistant from the faces of the tooth as measured along said pitch circle. Under the aforementioned conditions when the eccentric portion 104 is rotated in a clockwise direction, see Fig. 13, the gear 102 will rotate counterclockwise and the dwell pin 132 has been found to travel a curved path in going from A to B to C etc. Since this is the unrestrained path of the pin 132 on the inner gear 102, the gear may be guided along this curved path to achieve a dwell in the outer gear 18. When the inner rotor 102 is restrained so as to deviate from this path, the outer gear 106 is driven.

However, it is highly important for the inner rotor 102 to follow the curved path unrestrained. Deviations or variations of the pin from said path due to the action of the dwell slot 108 of slotted plate 110 on said pin 132 will drive the outer gear 106. The dwell slot 108 is shown in phantom in Fig. 11 and as being inclined with respect to a radial line through the center of the inner gear and the dwell pin 132. In the position shown, see Figs. 11 and 12, the center line 111 of the dwell slot 108 approximately coincides with a portion of the curved path ABC. The extent of coincidence determines the amount which outer gear 106 will dwell based on degrees of rotation of the input shaft 54. This follows from the fact that the pin 132 is unrestrained and follows the curved path ABC for the length of coincidence, thereby permitting the inner gear 102 to rotate during this interval during which period no driving force is imparted to the outer gear 106. At the point where the curved locus ABC deviates from the center line of the slot 108, the slot restrains the pin 132 and prevents the inner gear 102 from rotating about its center. The extended portion of the slot permits longitudinal but nonrotative movement of the inner gear as it travels about the internally toothed gear 106, and by reason of its lesser number of teeth imparts rotative movement to the outer gear 106 which by means of the aforementioned gear train 137 drives the tape advance drum 188.

From the construction thus far described it will be apparent that, notwithstanding the gyration imparted to the inner gear 102 about the axis of the outer gear 106 which coincides with the axis of the main drive 54, when the slot in the dwell plate matches the locus of a pin 132 placed on the pitch point of the inner gear, the inner gear is the extent of such matching permitted to rotate. By so rotating no motion is imparted to drive the outer gear. However, where the slot does not match such locus, the inner gear is thereby restrained and the driving force imparted to said gear is thereby transmitted to drive the outer gear. As dwell plate 110 is angularly adjusted by sliding its lower portion along the slot 126 of member 112 and securing it in a new position by means of bolt 128 and nut 130, the center line of slot 108 will thereby coincide with a different portion of the locus ABC. This new position will thus dictate that the dwell resulting in the outer gear and in the tape advance drum 184 will occur during a different portion of the rotational cycle of the main input drive shaft 54.

Figure 14:
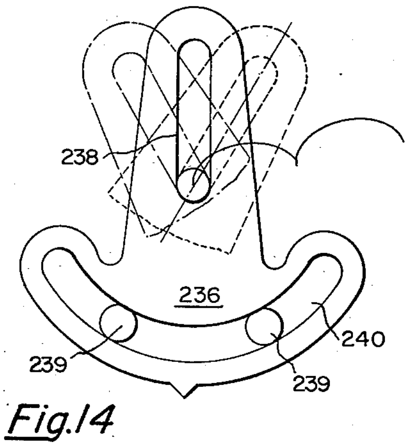
Fig. 14 is an enlarged elevational view of a modified form of dwell plate operable with the wobble gear mechanism illustrated in Fig. 10.

Another manner by which a variable dwell time may be attained is shown in the embodiment of Fig. 14. This shows an adjustable dwell plate 236. In the full line position of the dwell plate as shown the slot 238 is shown as being radially aligned with respect to the axis of rotation of the main drive shaft. In this position of the slot it appears that only an instantaneous dwell of the outer gear 106 will result. This follows from the fact that the dwell pin 132 by being cammed in the slot 238 will coincide with said curved path ABC and be restrained at only a single point thereon with each revolution of the drive shaft 54. As a practical matter, however, due to the clearances of the gear teeth 126 and 128, which must be maintained, a dwell of several degrees results. To vary the dwell time of the stepping mechanism, the dwell slot 238 may be rotated at an angle about the dwell pin 132. The dwell plate 236 is oriented by sliding it along pins 239—239, such sliding movement being permitted by slot 240 within said member. As in the relationship previously discussed with respect to Figs. 10 and 11, the dwell pate is adjusted so that the center line of the slot 238, unidentified by numeral, coincides with a portion of the curved locus ABC corresponding to the dwell which it is desired to obtain in timed relation to degrees of rotation of input shaft 54. If the rotation of the input shaft is reversed, for example, if the dwell occurred from 0° to 45° of the input cycle, it will be reversed so as to occur from 315° to 360°. But upon this reverse rotation, if it is desired in a tape marking system to have the dwell time occur at the same portion of the input cycle, the dwell plate may be oriented to the same angular position on the opposite side of the center line. Thus it is readily seen that a reversible tape marking system may be provided in accordance with the present invention.

Figure 15:
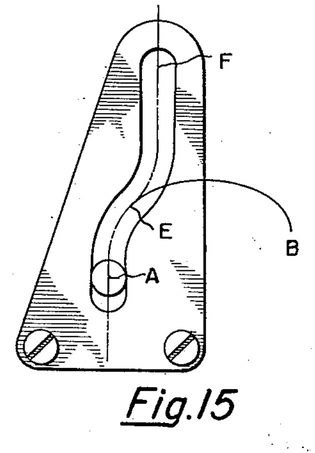
Fig. 15 is an elevational view of a modified form of dwell plate.

Referring now to Fig. 15 still another embodiment of a dwell plate 246 is shown fixed to structure not shown as by bolts 248. This embodiment is adapted to produce a dwell time of approximately 90° of the input cycle. This is more precisely achieved than with the aforementioned inclined slot arrangement by so shaping a portion of the dwell slot 250 so that a portion of said slot will coincide with a curved path ABC, see also Fig. 12, of the input cycle and the remaining part of the center line such as indicated by EF may be made to coincide with a line extending radially from the axis of rotation of shaft 54. Thus it is seen that this slot curvature more nearly matches and approximates the theoretically desired curvature ABC, Figs. 11 and 12, than said aforementioned inclined slot 108 and slot 238. It is apparent that the outer gear may dwell only while the dwell pin travels the distance as indicated between A and E on the center line 252. Thus it is seen that the dwell time of the outer gear can be changed by either varying the position of the slot as in Figs. 10 and 14 or by varying the shape of the slot in Fig. 15.

To determine the instantaneous velocities of the outer gear 106, reference again may be had to Fig. 10. It may be best to analyze its motion by following through the lever arms and pivot points of the inner gear 102 as it rotates in said outer gear. The pivot point of the inner gear may at any instant be located at the intersection of the horizontal line through the center of dwell pin 132, and the line perpendicular to the point of tangency of the inner gear 102 and the outer gear 106. Since the lever arm L is longest when the topmost teeth of the inner rotor 102 such as *f*, *g*, are in mesh with the topmost teeth of rotor 106, it readily follows that the maximum velocity is imparted to the outer rotor 106 at that time. As the teeth nearer the dwell pin, such as *d*, *e*, or *h*, *i*, are driving the lever arm L is considerably shorter, therefore the velocity imparted to the outer gear is less. When the bottommost teeth of the inner gear is in mesh, the length of L is zero since the pivot point lies on the pitch circle of the inner gear. The outer gear is therefore at rest in this latter position of the inner gear.

It should be noted that if dwell pin 132 is placed at a point removed from the pitch circle the lever arm L will at all times have a positive value and cannot have a zero value as mentioned above when the bottommost teeth of the inner gear are in mesh. With the pin thus removed from the pitch circle, the velocity imparted to the outer gear will always have a positive value and no dwell or stoppage will occur in said outer gear.

Figure 16:
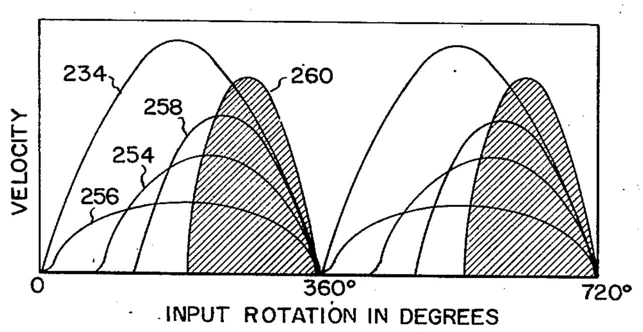
Fig. 16 is a graph representing the instantaneous velocities of the gears of the change speed stepping mechanism.

In Fig. 16 are shown curves indicating the relative instantaneous velocites of the inner rotor 102 and the outer rotor 106 for various positions of an adjustable plate 236 similar to the one shown in Fig. 14. The curve 234 represents the instantaneous velocity of the inner rotor 102 which remains the same for any slot orientation. The curve 254 represents the corresponding instantaneous velocity of the outer rotor 106 for a dwell plate whose slot is oriented at an angle of 30° from the center line 244. Curve 256 corresponds to the dwell 236 having its slot 238 extending radially from the axis of rotation of the main drive shaft 54 and coinciding with the center line 244 of Fig. 14. This radially disposed slot produces a theoretical dwell time of zero degrees as represented by 0°, 360° and 720°. Curve 258 represents a curve produced by a slot disposed at 60°, and curve 260 for a 120° orientation. The average output velocity for any one position of the dwell plate is equivalent to the area subtended by the curve representing the instantaneous velocities for that position and is the same regardless of where the plate is fixed. The change in orientation of the plate in effect will push the peak of the curves up or down so as to change the instantaneous output pattern. It is observable that the wobble gear mechanism provides smooth operation of the tape feed, with gradually applied accelerations without any free motion or coasting periods. Since the tape feed drum 184 is gradually accelerated, the pins 194 which pass through the tape 196 are less likely to tear the tape. Further since the gear train 143 is a positive transmitting connection between the outer gear 106 and the tape advance drum 184 the tape is advanced in equal increments during each punching cycle regardless of the speed at which the punch is operated.

It is further seen that in this tape marking arrangement it is possible with a single driving shaft directly driven by a motor to provide the functions of intermittent drive, speed reduction and synchronism with a minimum of associated equipment. The differential gear stepping mechanism is capable of efficiently providing the unitary speed reduction-intermittent drive function.

It is therefore clear from the foregoing description that the present invention has advanced the state of the art by providing a high speed tape feed and marking device in which a stepping mechanism is provided for converting continuous rotation to intermittent rotation. Provisions for readily varying the dwell period has improved the speed efficiency so that a positive acting high speed tape feed drive for marking devices becomes practicable.

Having therefore described detailed embodiments of the invention, setting forth their organization and their mode of operation, those features believed descriptive of the nature of the invention are defined with particularity in the appended claims.

What is claimed is:

1. Gear driving mechanism comprising, in combination, an outer driven gear having internal teeth, an inner driving gear within the outer gear and having a lesser number of external teeth than the number of teeth of the outer gear and shaped to mesh therewith, said inner gear having a diameter less than the diameter of the internal toothed periphery of the outer gear and eccentrically positioned therewithin such that when the two gears are in mesh with one another the inner gear engages the outer gear along a portion of its periphery leaving the balance of the teeth of the two gears out of mesh with one another, means for gyrating the inner gear about the axis of the outer gear and for permitting angular movement of the inner gear about its own axis while gyrating, said gyrating movement of the inner gear causing the same to traverse the internal toothed periphery of the outer gear bringing the teeth of the two gears into successive mesh with one another, means for controlling the rotation of the inner gear about its axis, notwithstanding the gyration thereof about the axis of the outer gear, to provide intermittent movement of the outer gear, said means including a member connected to an external support and having a pin and slot connection with the inner gear, the slot of said pin and slot connection having a portion of its length coinciding with the locus generated by a point on the inner gear when the latter is rotated about its own axis to thereby permit angular movement of the inner gear about its axis during each gyration thereof with the consequent retardation of the rotation of the outer gear.

2. Gear driving mechanism comprising, in combination, an outer driven gear having internal teeth, an inner driving gear within the outer gear and having a lesser number of external teeth than the number of teeth of the outer gear and shaped to mesh therewith, said inner gear having a diameter less than the diameter of the internal toothed periphery of the outer gear and eccentrically positioned therewithin such that when the two gears are in mesh with one another the inner gear engages the outer gear along a portion of its periphery leaving the balance of the teeth of the two gears out of mesh with one another, means for gyrating the inner gear about the axis of the outer gear and for permitting angular movement of the inner gear about its own axis while gyrating, said gyrating movement of the inner gear causing the same to traverse the internal toothed periphery of the outer gear bringing the teeth of the two gears into successive mesh with one another, means for controlling the rotation of the inner gear about its axis, notwithstanding the gyration thereof about the axis of the outer gear, to provide intermittent movement of the outer gear, said means including a member connected to an external support and having a pin and slot connection with the inner gear, the pin and slot connection being such that for each gyration of the inner gear the pin slidingly reciprocates in the slot, said slot being so shaped that a portion of its length coincides with the locus of a point on the inner gear when the latter rotates on its own axis and the balance of its length is non-coincident with any such locus, the result being that said pin is permitted to traverse the locus of said point for a part of its reciprocatory movement in the slot thus allowing the inner gear to have an angular movement about its axis during each gyration thereof during which time the driving force applied by the inner gear to the outer gear is interrupted thereby causing a dwell in the rotational movement of the outer gear.

3. In a differential gear stepping mechanism, an internal gear element, a driven gear within said internal gear element, means for gyrating said last named gear and causing it to traverse the periphery of the internal gear element, and means for controlling rotation of the gyrating gear, notwithstanding gyrations of the gear, comprising a member having a rotation controlling slidable connection with the gear, said member being connected to an external support, the aforementioned connection in one position thereof permitting rotation of said gyrating gear, and in another position thereof locking said gyrating gear against rotation.

4. In an intermittent drive mechanism for a tape marking device the combination of a tape advance drum, a power shaft, an internally toothed gear mounted for rotation on said shaft, a positive transmitting connection between said internally toothed gear and said tape advance drum, an eccentric driven by said shaft, an externally toothed gear mounted loosely on said eccentric and having a lesser number of teeth than said internally toothed gear, a member for controlling the rotation of said externally toothed gear, said member being connected to an external support, said member having a pin slot connection directly with said externally toothed gear, one portion of said slot permitting rotation of said gear, and another portion of said slot locking said gear against rotation.

5. A differential gear stepping mechanism including means providing a dwell time comprising, an inner gear, an outer gear, means to adjust the dwell time of said outer gear comprising a dwell pin fixed to the inner gear for restricting the motion of said inner gear, and a dwell plate having a slot receiving said dwell pin, said dwell plate fixed to a member relatively stationary with respect to the inner gear to restrain the dwell pin in a defined path and being adapted for selective positioning about a fixed point, whereby the dwell time of said outer gear varies with the length of the center line of the slot in said dwell plate that coincides with a curved path of a point on the inner gear when unrestrained and is variably selectable as a function of the position of the dwell plate.

6. A differential gear stepping mechanism comprising, an inner gear, an outer gear, means imparting a dwell time to said outer gear including a linkage fixed to restrict the motion of a point moving with the inner gear, each of said gears having a different number of teeth adapted to mesh in such a manner as to produce a speed reduction in the outer gear, whereby the mechanism both reduces the driving speed and provides intermittent motion.

7. In a differential gear stepping mechanism comprising, an outer gear having internally extending teeth, a driven gear within said outer gear and having a lesser number of teeth than said outer gear, means for gyrating said driven gear and causing it to traverse the periphery of the outer gear, and means for controlling rotation of the gyrating gear, notwithstanding gyrations of the gear, comprising a member for alternately locking said gyrating gear against rotation and for permitting rotation thereof, said member connected to an external support, said member having a slot, a pin secured on said gyrating gear and engaging said member in said slot, one portion of said slot shaped to permit free movement of said pin thereby permitting rotation of said gyrating gear about its center to provide a dwell time in said outer gear, and another portion of said slot shaped to lock said gyrating gear against rotation about its center thereby imparting motion to rotate said outer gear about its axis.

References Cited in the file of this patent

UNITED STATES PATENTS

| | | |
|---|---|---|
| 1,667,184 | Ballard | Apr. 24, 1928 |
| 2,015,990 | Booman | Oct. 1, 1935 |

FOREIGN PATENTS

| | | |
|---|---|---|
| 79,761 | Sweden | Mar. 6, 1934 |